United States Patent [19]

Quate

[11] 4,267,732
[45] May 19, 1981

[54] ACOUSTIC MICROSCOPE AND METHOD

[75] Inventor: Calvin F. Quate, Stanford, Calif.

[73] Assignee: Stanford University Board of Trustees, Stanford, Calif.

[21] Appl. No.: 964,613

[22] Filed: Nov. 29, 1978

[51] Int. Cl.³ .......................................... G01N 29/00
[52] U.S. Cl. ..................................... 73/606; 73/643
[58] Field of Search ............... 73/606, 607, 608, 618, 73/620, 627, 643; 340/1 R, 3 R, 5 MP, 5 H; 128/660; 367/7, 8

[56] References Cited

U.S. PATENT DOCUMENTS

| 4,028,933 | 6/1977 | Lemons et al. | 73/627 |
| 4,046,477 | 9/1977 | Kaule | 73/643 |
| 4,091,681 | 5/1978 | Hordvik | 73/574 |
| 4,137,991 | 2/1979 | Melcher et al. | 73/643 |

OTHER PUBLICATIONS

J. Krautkramer et al., *Ultrasonic Testing of Materials*, pp. 150-155 and 171, 172, 1977.
Y. H. Wong et al., "Surface and Subsurface Structure of Solids by Laser Photoacoustic Spectroscopy", Applied Physics Letters, vol. 32, No. 9, pp. 538-539, May 1, 1978.
G. Cachier, "Laser Excitation of Microwave Sound in Solids", Journal of the Acoustical Society of America, vol. 49, No. 3 (part 3), pp. 974-978, 1971.
V. Jipson et al., "Acoustic Microscopy at Optical Wavelengths", Applied Physics Letters, vol. 32, No. 12, pp. 789-791, Jun. 15, 1978.
E. Spiller et al., "Optics of Long-Wavelength X-Rays", Scientific American, vol. 239, No. 5, pp. 70-78, Nov. 1978.
M. G. Rockley et al., "Observation of a Nonlinear Photoacoustic Signal with Potential Application to Nanosecond Time Resolution", Appl. Phy. Let., vol. 31, No. 1, 1977, pp. 24-25.
R. A. Lemons et al., "Acoustic Microscopy: Biomedical Applications", Science, vol. 188, pp. 905-911, May 30, 1975.
R. M. White, "Generation of Transient Waves by Transient Surface Heating", Journal of Applied Physics, vol. 34, No. 12, pp. 3559-3567, Dec. 1963.
L. B. Kreuzer et al., "Nitric Oxide Air Pollution: Detection by Optoacoustic Spectroscopy", Science, vol. 173, pp. 45-47, Jul. 2, 1971.
A. Rosencwaig, "Photoacoustic Spectroscopy of Solids", Optics Communications, vol. 7, No. 4, pp. 305-308, Apr. 1973.
L. C. Aamondt et al., "Size Considerations in the Design of Cells for Photoacoustic Spectroscopy", Journal of Applied Physics, vol. 48, No. 3, pp. 927-933, Mar. 1977.
M. M. Farrow et al., "Piezoelectric Detection of Photoacoustic Signals", Applied Optics, vol. 17, No. 7, pp. 1093-1098, Apr. 1, 1978.
C. G. Ghizoni et al., "On the Use of Photoacoustic Cell for Investigating the Electron-Phonon Interaction in Semiconductors", Applied Physics Letters, vol. 32, No. 9, May 1, 1978, pp. 554-556.
R. J. vonGutfeld et al., "20-MHZ Acoustic Waves from Pulsed Thermoelastic Expansions of Constrained Surfaces", Applied Physics Letters, vol. 30, No. 6, pp. 257-259, Mar. 15, 1977.

*Primary Examiner*—Stephen A. Kreitman
*Attorney, Agent, or Firm*—Flehr, Hohbach, Test

[57] ABSTRACT

An acoustic apparatus and method for microscopic imaging and spectroscopy. The apparatus includes a plurality of devices for exciting an object of interest so that acoustic waves are propagated from the object. These devices include lasers, x-ray sources, microwave generators, ultraviolet sources, and electric current generators. The acoustic waves propagated from the object of interest are detected and the object of interest and the acoustic wave detector are moved with respect to each other in a raster scanning pattern. The magnitude of the detected acoustic waves and the corresponding raster pattern of the object are recorded so that a visual image of the object can be obtained. In addition, the frequency of the exciting electromagnetic radiation that excites the object can be varied so that both the absorption spectra and the Raman frequency mode of the object can be determined.

28 Claims, 8 Drawing Figures

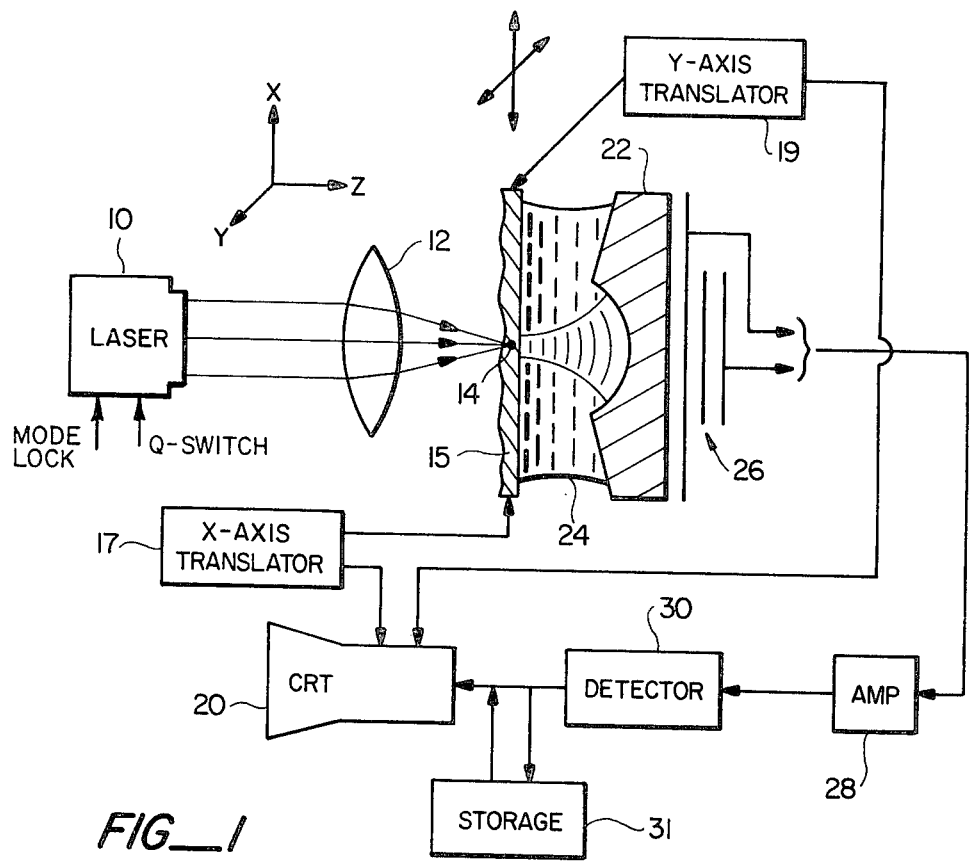
FIG_1
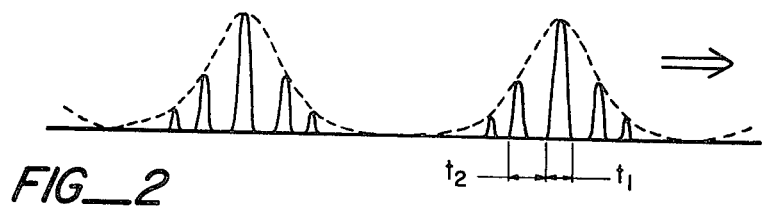
FIG_2
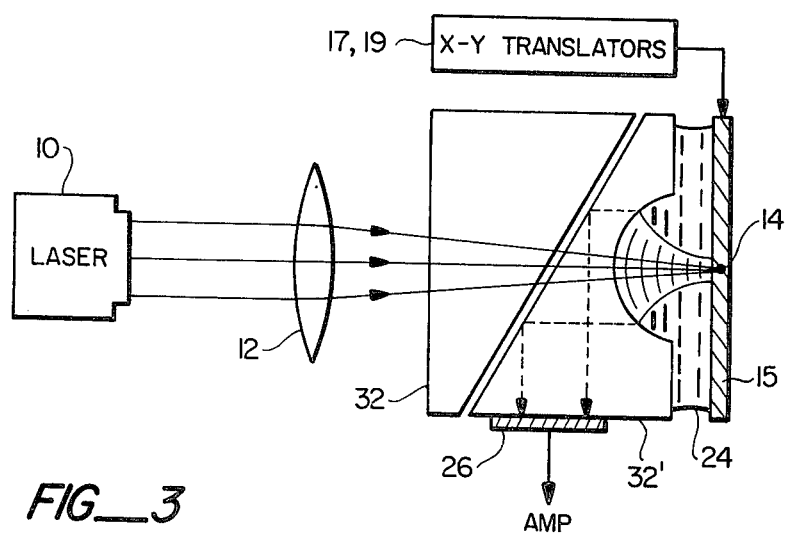
FIG_3

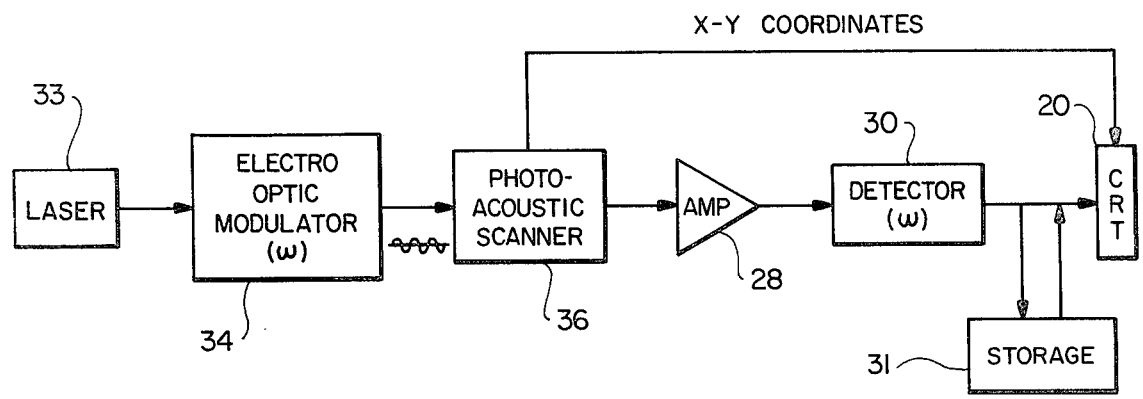
FIG_4
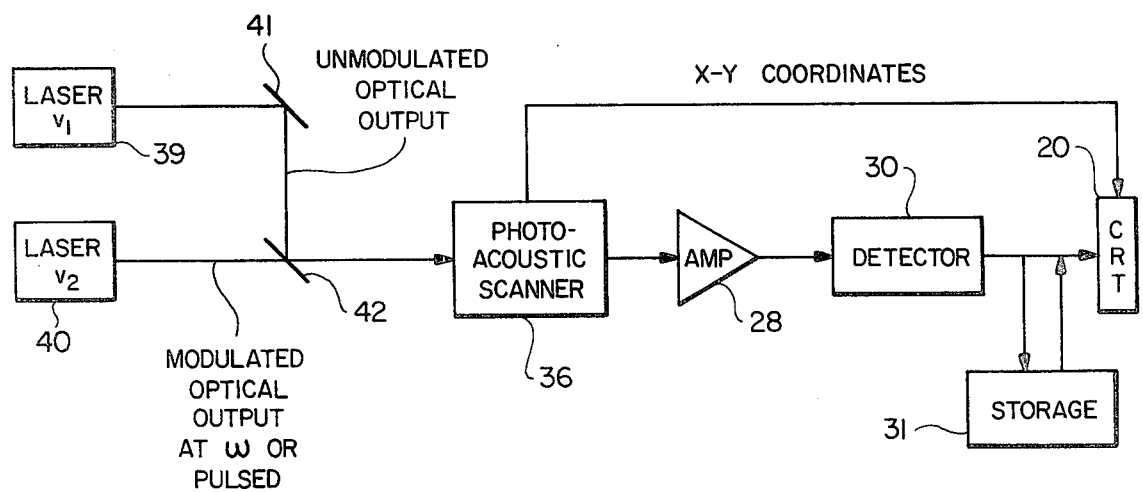
FIG_5

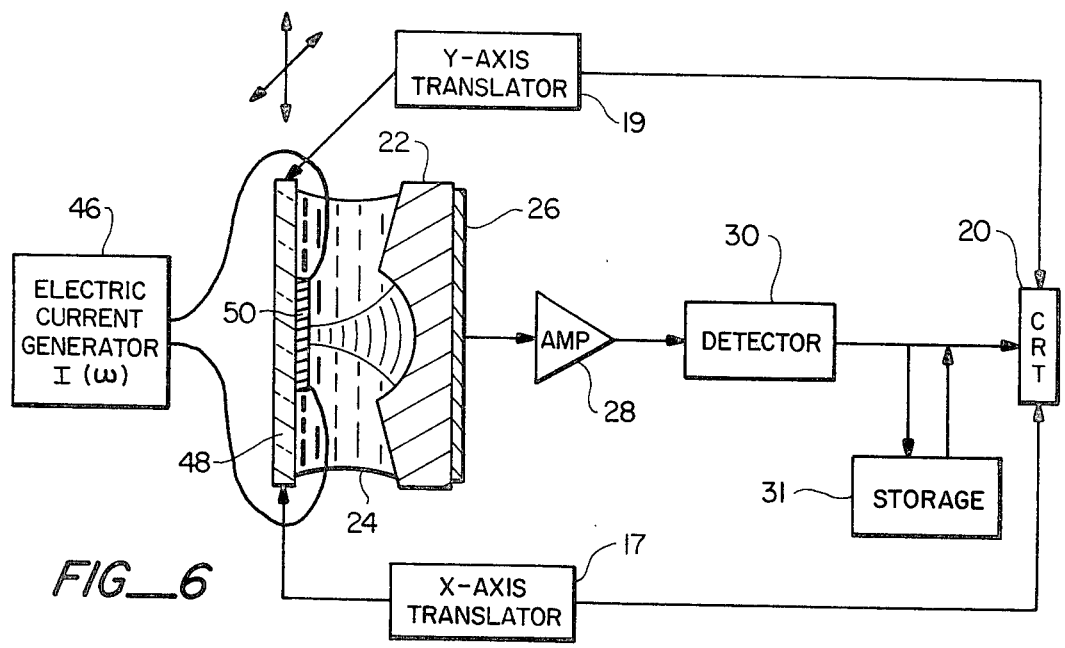
FIG_6
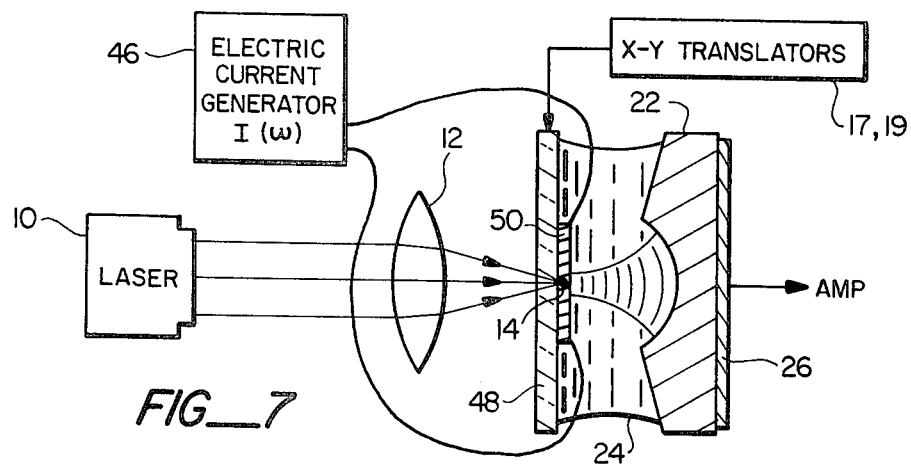
FIG_7
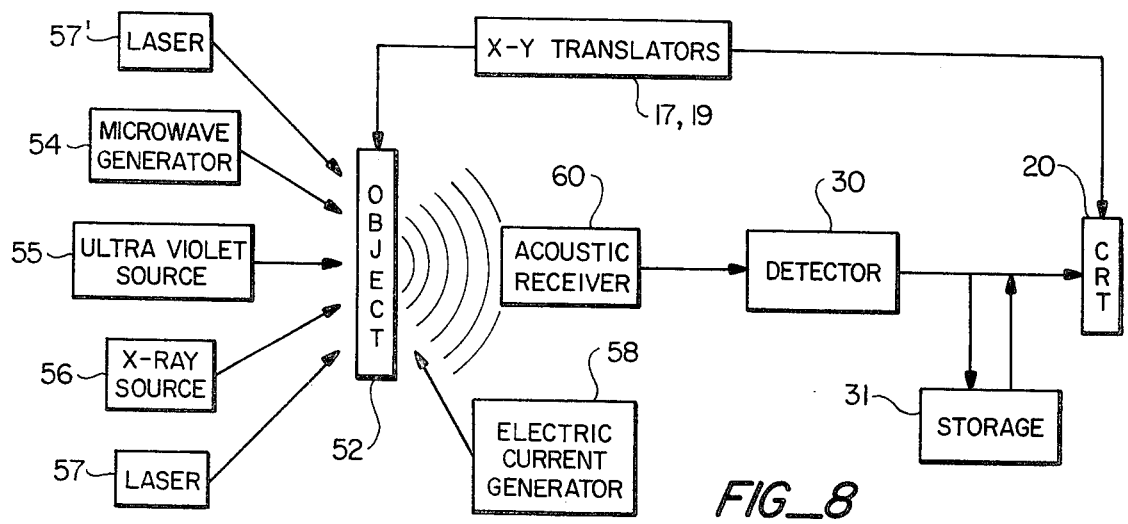
FIG_8

ACOUSTIC MICROSCOPE AND METHOD

The present invention was developed in the course of work funded by the U.S. Air Force Office of Scientific Research, AFOSR-77-3455.

The present invention generally relates to microscopic acoustic imaging and to spectroscopy.

In 1881 J. Tyndall, William C. Rontgen, and Alexander G. Bell discovered the photoacoustic effect. At low frequencies this effect occurs when a gas in an enclosed cell is illuminated with pulsating light. Any energy that is absorbed from the light by the gas is converted into kenetic energy. This conversion gives rise to pressure fluctuations of the gas molecules within the cell. These three investigators found that the pressure fluctuations generated sounds which could be heard by the human ear.

R. M. White in an article entitled "Generation of Elastic Waves by Transient Surface Heating" in the Journal of Applied Physics, Vol. 34, No. 12, December 1963, pp. 3559-3567 demonstrated that electromagnetic energy in various forms can be used to heat materials and to generate acoustic waves. He found that when the surface of a body is subjected to transient heating, elastic waves are produced as the result of surface motion caused by thermal expansion.

Over the years there have been many researchers investigating the photoacoustic effect and many papers have been published describing this area of technology. In the July 2, 1971 issue of Science in a report entitled "Nictric Oxide Air Pollution: Detection by Optoacoustic Spectroscopy" pp. 45-47 L. B. Kreuzer and C. K. N. Patel described the use of a sensitive microphone and a tunable laser to detect minute concentrations of gas pollutants using the photoacoustic effect. In addition, A. Rosencwaig in an article entitled "Photoacoustic Spectroscopy of Solids" which appeared in Optics Communications Vol. 7, No. 4 April 1973, pp. 305-308 described his work in the photoacoustic effect of solids. L. P. Aamondt et al. in the article "Size Considerations in the Design of Cells for Photoacoustic Spectroscopy", Journal of Applied Physics, Vol. 48, No. 3, March 1977, pp. 927-933, studied the sensitivity dependence of photoacoustic spectrometers on the physical dimensions of the sample cell. In addition, in 1967 M. J. Brienza and A. J. DeMaria in Vol. 11 of Applied Physics Letters, pp. 44, 1967 demonstrated that mode-locked lasers with Q-switching can be used to generate intense sound beams through surface heating of metal films deposited on piezoelectric crystals. M. M. Farrow et al. reported on the use of piezoelectric detectors for measuring optically generated acoustic signals in the article "Piezoelectric Detection of Photoacoustic Signals" in Vol. 17, No. 7 of Applied Optics, April 1978, pp. 1093-1098. C. C. Ghizoni et al. in the article "On the Use of Phtoacoustic Cell For Investigating the Electro Phonon Interaction in Semi-Conductors" Applied Physics Letters, Vol. 32 (9) dated May 1, 1978, pp. 554-556 used periodic current flow to heat silicon and to generate useful thermoelastic signals. R. J. vonGutfeld and R. L. Melcher considered the problem of thermo-elastic generation of acoustic waves in their article entitled "20-MHz Acoustic Waves From Pulsed Thermo-Elastic Expansions of Constrained Surfaces" Applied Physics Letters, Vol. 30, No. 6, Mar. 15, 1977, pp. 257-259. They suggested the use of photoacoustic signals for the detection of flaws in metallic samples. Y. H. Wong in the article "Surface and Subsurface Structure of Solids by Laser Photoacoustic Spectroscopy" Applied Physics Letters, Vol. 32 (9) May 1, 1978, pp. 538-539 describes the use of photoacoustic signals in a glass cell for imaging defects in ceramics of silicon nitride. Further, G. P. Cachier in the article "Laser Excitation of Microwave Sound in Solids" Vol. 49, No. 3 (part 3) of the Journal of the Acoustical Society of America, pp. 974-978 describes generating sound at microwave frequencies with a Q-switched ruby laser and producing pulses at 800 MHz.

In 1975 R. A. Lemmons and C. F. Quate invented the scanning acoustic microscope. In this device a high frequency plane wave is focused by an acoustic lens to scan an object located at the focal point of the lens. The acoustic waves either are transmitted through or are reflected by the object. In either case the acoustic waves are thereafter recollimated by a second acoustic lens and are detected with a piezoelectric detector. The detected signals are applied to an oscilloscope to provide a visual display of the object. This device is further described in the Lemmons and Quate patent entitled "Acoustic Microscope" U.S. Pat. No. 4,028,933 issued June 14, 1977. In addition, this apparatus is described in the article "Acoustic Microscopy: Bio-Medical Applications" by Lemmons and Quate in Science, Vol. 188, May 30, 1975, pp. 905-911 and in the article "Acoustic Microscopy at Optical Wave Lengths" by V. Jipsom and C. F. Quate, Applied Physics Letters Vol. 32 (12) dated June 15, 1978, pp. 789-791.

The scanning acoustic microscope was a step forward in the field of microscopy because of the fundamental distinction between light and sound and because these two forms of radiation interact differently with the constituents of the specimen. An optical microscope senses the dielectric properties of the object whereas a scanning acoustic microscope measures the variations in the elastic properties of the specimen.

The present invention is likewise a step forward in the field of microscopy because it operates on the absorption characteristics of specimens. The apparatus disclosed herein microscopically images specimens by recording the acoustic waves emitted by the specimens under various conditions of excitation. In addition, the apparatus can be used to measure the absorption spectra and the Raman spectrum of specimens.

One object of the present invention is to image specimens of interest on a microscopic scale and to develop a photoacoustic microscope that has a resolving power that is at least as good as an optical microscope. These objects are achieved by using very high frequency electromagnetic radiation and high frequency electric currents to excite the specimen of interest. As the frequency increases, the diameter of the excited portion of the object is narrowed. The resolving power of the microscope thereby increases and sharper definition of the characteristics being measured is achieved. The present invention contemplates using electromagnetic radiation having frequencies greater than 100 MHz and using electric currents having a frequency greater than 100 MHz.

An additional object of the present invention is to identify materials by measuring their absorption spectra on a microscopic scale. The present invention contemplates scanning the electromagnetic radiation in frequency and recording the absorption spectra. This scanning leads to identification of the constituents of the specimen on a point by point basis across the imaging field. The present invention also contemplates identifying the molecular components in specimens through its Raman spectra.

A significant feature of the present invention is that it permits the measurement of the absorption spectra of biological material and single cells and the mapping of significant features in the biological systems. The present invention is capable of scanning live cells and identifying components such as hemoglobin and DNA. Further, the distribution of these cells across the imaging field can be mapped and visually observed.

Still another object of the present invention is to observe structural phenomenon in various materials and subsurface physical features. In particular, the present invention can scan semi-conductors and integrated circuits for subsurface defects. In one embodiment an integrated circuit is energized by pulsing an electric current through it and the resulting resistive heating of the circuit is observed. In another embodiment light is propagated through the back of a semi-conductor wafer and the resulting acoustic waves propagated through the front surface of the semi-conductor are imaged. Also the metalization and its contact to silicon substrates can be scanned at high speed and nonuniformities detected.

An additional object of the present invention is to perform x-ray microscopy by scanning objects of interest with x-rays having wave lengths of between about 10 and 1000 nanameters. This scanning is performed in one of several applications by illuminating objects of interest with the x-rays and ultravioled radiation produced by a synchrotron particle accelerator. A further description of the use of long wavelength x-rays in microscopy is contained in the article entitled "The Optics of Long-Wavelength X-rays" by E. Spiller and R. Feeder, Vol. 239, No. 5 of Scientific American, November, 1978, pp. 70–78.

These and other objects are achieved by an acoustic microscope comprising means for exciting an object of interest so that acoustic waves are propagated therefrom. The microscope also includes means for detecting the acoustic waves propagated from a microscopic portion of the object and means for moving the object of interest and the detecting means with respect to each other so that the object of interest is scanned in a raster pattern and the acoustic waves propagated from the object are recordable.

Other objects and features of the invention will appear from the following description in which the preferred embodiments have been set forth in detail in conjunction with the accompanying drawings.

FIG. 1 is a diagrammatic view, partially in section, of one embodiment of the acoustic microscope. This embodiment utilizes an optical laser and operates in the transmission mode.

FIG. 2 is a graphic representation of the optical pulse train emitted by the laser of FIG. 1.

FIG. 3 is a diagrammatic view, partially in section, of a second embodiment of the acoustic microscope. This embodiment operates in the reflection mode and also uses an optical laser.

FIG. 4 is a block diagram of a third embodiment of the acoustic microscope. This embodiment excites the object of interest with a sinusoidal modulated optical beam.

FIG. 5 is a block diagram of a fourth embodiment of the acoustic microscope for scanning the Raman vibrational modes of an object of interest.

FIG. 6 is a diagrammatic view, partially in section, of a fifth embodiment of the acoustic microscope wherein the object of interest is excited by an electric current generator.

FIG. 7 is a diagrammatic view, partially in section, of a sixth embodiment of the acoustic microscope wherein the object of interest is excited by both an electric current generator and by a laser.

FIG. 8 is a block diagram of the acoustic microscope illustrating the various sources of sample excitation that may be utilized either individually or simultaneously in combination.

FIG. 1 illustrates one embodiment of an acoustic microscope according to the present invention. This embodiment includes a laser 10 which excites an object of interest so that acoustic waves are propagated therefrom. The acoustic waves resulting from the thermoelastic coupling between the light from the laser and the object of interest have a frequency which is determined by the modulation envelope of the optical beam. In the preferred embodiment a Nd:YAG laser having an output wavelength of 1.06 $\mu$m is used. The laser is mode locked and Q-switched. The mode locking causes the laser to radiate the narrow pulses illustrated in FIG. 2. The Q-switching determines the modulation envelope and forms the pulses into bursts.

In one embodiment actually constructed the optical output from the laser consisted of packets of light 200 nsec in duration with a repetition frequency of 2.7 MHz. Within each packet the pulses in the mode-locked pulse train, FIG. 2, were 0.2 nsec in width ($\tau_1$) with a repeat at 210 MHz ($1/\tau_2$).

The output of the laser 10, FIG. 1 is directed toward an optical objective lens 12 that focuses the light to a focal point 14. In the preferred embodiment a microscope objective lens (NA=0.25) is used and the optical beam from the laser is focused to a diameter of 2 micrometers.

For ease of handling, the object of interest 15, FIG. 1 is mounted on a transparent mounting such as a mylar sheet or a glass slide. For clarity this mounting is not shown in the figures. The sample 15 is moved through the focal point 14 in a raster scanning pattern that is parallel to the x-y plane. The sample is moved in the focal plane of the apparatus by an x-axis translator 17. In the preferred embodiment the x-axis translator is a mechanical stage that slowly raises the object of interest in the vertical direction. The translator is also connected to a potentiometer (not shown) which converts the x position of the sample on the focal plane into an electrical output signal. The sample is also moved in the focal plane along the y-axis by a y-axis translator 19. In the preferred embodiment this translator is an audio speaker (not shown) and it moves the sample rapidly back and forth in a horizontal direction. The audio speaker is driven in a reciprocal manner by an audio oscillator. The audio oscillator also provides an electrical output signal indicating the position of the sample on the y-axis. The x and y position signals are fed to a conventional image retention oscilloscope or CRT 20 so that the raster scan of the CRT is synchronized with the raster scan of the motion of the object 15 through the focal point of the apparatus.

The acoustic microscope is used on materials having optical absorption bands that transfer energy from the optical beam into acoustic radiation. The change in temperature and the thermal expansion which accompanies the absorption of optical energy generates acoustic waves at a frequencies corresponding to twice the amplitude modulation of the optical beam. The acoustic energy is at twice the frequency of the amplitude modulation of the heating source because the heating is proportional to the square of the input. The optical pulse train that is focused on the sample 15, FIG. 1 causes it to radiate acoustic waves from the focal point 14. These acoustic waves are incident on the concave surface of an acoustic lens 22. The acoustic lens collimates the waves into plane waves which can be detected without substantial distortion. The acoustic lens is a saphire crystal with a receiving area having a radius of 200 micrometers. The acoustic lens detects the sound waves having a frequency of approximately 840 MHz and has a focal point with a diameter of approximately 1 micrometer. The acoustic lens is coated with a quarter-wavelength layer of glass (not shown) to minimize reflection at the lens surface. The acoustic lens is positioned in the apparatus so that its focal point is coincident with the focal point 14 of the optical lens 12. This arrangement ensures that the optical pulse train which is focused on the focal point 14 generates acoustic waves that are received by the acoustic lens.

In reaching the acoustic lens 22, FIG. 1 the acoustic waves are propagated through a liquid 24 such as water. Other fluids such as methanol, liquid nitrogen and liquid argon can be used. The liquid permits the object of interest to be moved with respect to the acoustic lens while transmitting acoustic waves across the gap between the object and the lens.

The acoustic plane waves collimated by the acoustic lens 22 are converted into electricals signals by a transducer 26. The transducer includes a thin layer of gold deposited on the rear surface of the acoustic lens followed by a sputtered layer of zinc oxide and a second, outer layer or gold. The combination of these three layers forms a capacitor with a zinc oxide dielectric. In the preferred embodiment such a zinc oxide transducer has a response centered near 800 MHz and a band width of 100-200 MHz.

The outputs signals from the transducer 26, FIG. 1 are passed to an amplifier 28 which increases their signal strength and reduces their frequency from 800 MHz to base band. The output of the amplifier is connected to a detector 30 which is a tuneable radio receiver. The detector also converts the amplifier output into a direct current signal level which is used to modulate the intensity of the oscilloscope 20. The signal level can also be recorded in a storage device 31 such as magnetic tape.

The output of the detector 30, FIG. 1, along with the electrical signals from the x and y-axis translators 17, 19 indicating the position of the focal point with respect to the raster scan of the object are recorded on the display of the CRT 20. It should be understood that the raster positions and the transducer output signals can be recorded on any suitable means including a CRT, a floppy disc, and magnetic tape.

In one embodiment of the present invention that was actually constructed, the acoustic lens 22, the transducer 26, the x and y-axis translators 17, 19, the amplifier 28, the detector 30 and the oscilloscope 20 were all taken from an operating scanning acoustic microscope of the type described in the Lemmons and Quate entitled "Acoustic Microscope" U.S. Pat. No. 4,028,933. To convert the scanning acoustic microscope over the embodiment illustrated in FIG. 1, the acoustic wave source and the input acoustic lens were replaced by the laser 10 and the optical lens 12.

In one mode of operation the apparatus illustrated in FIG. 1 microscopically images the object of interest 15. The laser 10 generates and propagates the optical pulse train illustrated in FIG. 2. The pulses are focused by the optical lens 12 on the focal point 14. The optical pulses are absorbed at that point by the sample and are converted into acoustic energy. The optical pulses cause a fluctuating change in temperature and a fluctuating thermal expansion in the sample at the focal point. These fluctuations generate acoustic waves having frequencies corresponding to twice the amplitude modulation of the optical beam. The acoustic energy is at twice the frequency of the amplitude modulation of the heating source because the heating is proportional to the square of the input. The acoustic waves generated at the focal point 14 propagate through the fluid 24 and are incident on the concave surface of the acoustic lens 22. The acoustic lens collimates the acoustic waves into plane waves which are detected by the receiving transducer 26. The receiving transducer converts the acoustic plane waves into electrical signals and passes these signals to the amplifier 28 and the detector 30. The electrical signals are amplified and reduced in frequency. The detector filters out all but a narrow band of frequencies and converts these frequencies into a DC voltage level which is used to modulate the intensity of the beam of the oscilloscope or CRT 20.

The x and y-axis translators 17, 19 move the sample 15 through the focal point in a raster scan that is synchronized with the scan of the oscilloscope. The sample moves in the focal plane of the apparatus. The oscilloscope is a delayed image oscilloscope having an x-y presentation corresponding to the imaging area of the object of interest. The contrast of the display is proportional to the acoustic absorption of the sample in a transmission mode.

In another mode of operation the acoustic microscope performs spectroscopy. The frequency of the optical output of the laser is varied and the absorption spectrum of the sample is measured. The sample remains stationary and the amplitude of the acoustic waves produced by the microscopic portion of the sample at the focal point is measured as a function of the frequency of the laser. The constituents of the object of interest at the focal point can be determined from the absorption spectra. For example, silicon will absorb light with a wavelength less than 1.3 micrometers. Below this frequency silicon is optically transparent, and acoustic signals will not be generated in the silicon. In like manner DNA absorbs light at approximately 260 nanometers and hemoglobin has an absorption spectrum between 400 and 500 nanometers.

FIG. 3 illustrates an alternative embodiment of an acoustic microscope. In this embodiment the acoustic waves are reflected back along the axis of propagation of the laser beam. The laser 10 operates in the same manner as described above and has an output which is focused by the optical lens 12 on the focal point 14. The axis of propagation of the laser beam is orthogonal to the plane of the object of interest. The light beam from the laser passes through two pieces of optically transparent materials 32, 32' such as sapphire or YAG. The object of interest 15 generates acoustic waves in response to the incident light and these waves are propagated through the fluid 24 along the axis of reflection to the concave surface of the acoustic lens 32'.

The axis of reflection is orthogonal to the plane of the object of interest. The acoustic lens collimates the acoustic waves incident on its concave surface into plane waves. The two transparent materials 32, 32' are separated by a small air gap which transmits light but which reflects acoustic waves. In FIG. 3 the acoustic plane waves are reflected off of the inclined interior surface of the material 32' and are directed downward toward the transducer 26. The transducer detects the acoustic waves generated by the sample 15 and converts these waves into electrical signals which are processed by the amplifier, the detector, and the oscilloscope as described above. The sample is also translated by the x and y translators 17, 19 through the focal point in a synchronized raster scan.

The apparatus illustrated in FIG. 3 can operate both with a zero angle of reflection and with specular reflection. At the zero angle the axis of transmission of the optical beam and the axis of reflection of the acoustic waves are coincident and orthogonal to the plane of the sample. The acoustic waves are propagated directly back on top of the incident laser beam. In the specular mode the axis of transmission is incident on the surface of the object of interest at an angle of $\alpha°$ measured with respect to an axis orthogonal to the plane of the object of interest. The axis of reflection is inclined with respect to this orthogonal axis by an angle $\beta$. In the specular mode angle $\alpha$ = angle $\beta$ and the axis of transmission, the axis of reflection, and the orthoginal axis are all contained in a single plane.

The embodiment illustrated in FIG. 3 can be operated in both the microscopic imaging mode and the spectrographic mode of operation. More importantly, an examination of an object of interest using the reflection mode of operation has special application of metal films because there the thermal skin depth is greater than the skin depth of optical absorption and is also less than the sound wavelength. The present invention is able to penetrate through these layers due to photoacoustic absorption and is able to examine the underlying structure for defects. In this circumstance the conversion efficiency is directly proportional to the acoustic frequency.

It should be noted that the embodiments illustrated in FIGS. 1 and 3 can also be operated in the spectroscopic mode of operation to identify the constituents of the object of interest. The process of spectroscopic analysis is performed on a point by point basis across the scanning field as described above. The format of the output can be in multiple images of pseudocolor. The detector of this circumstance uses band pass filters to separate the detected signals into three frequency ranges. The signals in each range modulate the intensity of one of the primary color inputs to a color television set.

The theory of the photoacoustic effect indicates that the coupling coefficient is related to the generated acoustic power and to the square of the absorbed optical power. The photoelastic coupling constants are large in those materials with small heat capacity, large expansion coefficients and high values of thermal conductivity. In many metals the thermoelastic effect is a major source of acoustic attenuation. Thus, high values of photoacoustic coupling are found in those materials such as gold and silver where the acoustic attenuation is large. These high values contrast with the small photoacoustic coupling constants which are found in such materials as nickel and aluminum where the acoustic attenuation is small.

It should be noted that in gold the optical reflectivity is so high that very little of the incident energy (5%) is absorbed and also that the acoustic impedance is so high that very little of the generated acoustic power (10%) can be transmitted into the liquid. A material such as aluminum however has a lower value for both the reflectivity and acoustic impedance and thus is a much better imaging medium even though the photoelastic coupling is inferior to that of gold.

The embodiment illustrated in FIG. 4 utilizes a sinusoidally modulated optical beam. This embodiment requires less optical power to heat the sample at the focal point because only a single frequency is detected. The laser 33 is of conventional construction and has a constant optical output. The output is directed into an electro-optic modulator 34 of known construction with modulates the optical beam at a frequency $\omega$. In the preferred embodiment the frequency $\omega$ varies between 1000 MHz and 3000 MHz. The beam is thereafter focused on the sample in the same manner as described above. The photoacoustic scanner 36 represents the optical lens 12, the x and y-axis translators 17, 19, the acoustic lens 22, the transducer 26 and the fluid 24 as described above in connection with FIG. 1. The acoustic lens and the transducer are selected to have optimum sensitivity to acoustic waves having a frequency $2\omega$. The amplifier 28 and the detector 30 are also tuned to detect and amplify the single vibration frequency. In the preferred embodiment the amplifier and the detector are a conventional ratio receiver which is tuned to the single modulation frequency. The optical energy may also be pulsed with each pulse containing many r.f. cycles.

The embodiment of FIG. 4 is primarily used for microscopic imaging and is believed to be more efficient that the embodiment of FIG. 1. Each embodiment operates in the same manner but the embodiment of FIG. 1 modulates the laser beam into pulses that in turn generate acoustic waves having a much wider band width than that covered by the transducer 26, FIG. 1. In contrast, the embodiment of FIG. 4 permits the amplitude of the laser beam to be sinusoidally modulated at, for example, 800 MHz which concentrates the optical energy into the acoustic band and substantially improves the conversion efficiency.

FIG. 5 illustrates an embodiment of the acoustic microscope for identifying the atomic and molecular components of a given sample by observing the non-linear photoacoustic response to optical inputs at two selected frequencies. The apparatus includes a laser 39 having an unmodulated output with an optical frequency $\nu_1$. The apparatus also includes a second laser 40 having an optical output frequency $\nu_2$. The output from laser 40 also is either pulsed or modulated at a frequency $\omega$. The two outputs from the lasers are combined using the mirror 41 and either a half silvered mirror 42 or a prism. The combined output is thereby either pulsed or modulated at a frequency $\omega$.

The combined optical output of the two lasers 39, 40 is directed into a photoacoustic scanner 36 which can be either the transmitting apparatus illustrated in FIG. 1 or the reflecting apparatus illustrated in FIG. 3. In either case the optical output is focused to a narrow point on the object of interest and one of either the acoustic lens or the object of interest is scanned with respect to the other. The acoustic waves emitted from the object of interest are detected and transmitted to the amplifier 28 and the detector 30. The detector is a tunable radio receiver and detects the acoustic waves corresponding to the frequency of the amplitude modulation on the input beams. The output of the detector 30 is used to modulate the intensity of the display on the cathode ray tube 20. The x-y translators move the object of interest in a raster scan corresponding to the display on the cathode ray tube as described above.

This system can be used to identify molecular components by exciting the Raman vibrational modes of the molecular or the atomic constituents by adjusting the input optical frequencies $\nu_1$ and $\nu_2$ to correspond to the electronic levels in a given atomic species. To observe the electronic levels, the frequency $\nu_1$ is adjusted to correspond to an electronic excited state of the atom. This serves to transfer atoms from the ground state to the excited state. It has been observed that atoms in the excited state are more strongly absorbing than they are in the ground state. Thus the presence of the optical beam at frequency $\nu_1$ serves to enhance the absorption of the optical energy of the second beam at frequency $\nu_2$. For conventional photoacoustics see M. G. Rockley and J. P. Devlin in the article "Observation of a Nonlinear Photoacoustic Signal with Potential Application to Nanosecond Time Resolution", Applied Physics Letters, Vol. 31, p. 24, July 1, 1977.

To observe the Raman vibrational mode, the laser output frequencies are adjusted until the absolute value of the difference between the two operational frequencies $\nu_1$ and $\nu_2$ is equal to one of the Raman vibrational modes of the object of interest. That is to say, $|\nu_1 - \nu_2|$. The non-linear response of the molecules to these two inputs produces a driving force at the sum $(\nu_1 + \nu_2)$ and difference $(\nu_1 - \nu_2)$ and we choose the difference $(\nu_1 - \nu_2)$ to be equal to a Raman Vibrational mode. The apparatus illustrated in FIG. 5 can perform both microscopic imaging and spectroscopy. It should be noted, however, that this apparatus excites the object of interest at appropriate frequencies so that the molecular and atomic components in the specimen can be identified and their distribution can be measured over the scanning field. This mode of operation contrasts with the embodiments described above because in those embodiments optical energy at a single frequency serves at the input. For that situation the absorption is usually associated with the electronic ground states of the atom.

FIG. 6 illustrates an embodiment of the acoustic microscope wherein the object of interest is heated by an electric current to produce acoustic waves which are scanned by the apparatus. The apparatus includes an electric current generator 46 that operates at high frequency either in a pulsed mode or with a periodic output. In the preferred embodiment the electric current generator has an output frequency of 1.5 gigahertz. The electric current generator is electrically connected to the object of interest 50 by two leads. The object of interest is mounted on an electrically insulated support structure such as a glass microscope slide.

The electrically excited object of interest 50, FIG. 6 can be many things including an integrated circuit which is connected to the generator 46 so that current is passed through its conductive pathways. The current causes the resistive elements in the integrated circuit to heat and to generate acoustic waves. These acoustic waves are detected by the acoustic lens 22 and the transducer 26. The position and the heating characteristics of these resistive elements can thus be observed. In addition, the object of interest can be a metal film deposited in an insulating surface. The shape of the metal film or layer and its degree of attachment to the insulating surface can be scanned by passing a current through the layer. This current periodically heats the metal to a point where it radiates acoustic waves. The object of interest can also be a semi-conductor chip, a memory element, or the leads connecting semi-conductor elements together. If the conductive pathways transited by the exciting current in the object of interest do not normally have any electrical resistance, then the current from the generator can be increased to a point, above the normal operating level, where localized heating occurs. This localized heating causes acoustic waves to be propagated from the object of interest.

In the apparatus of FIG. 6 the acoustic waves emitted from the object of interest are converted into electrical signals by the transducer 26 and are amplified and detected by the amplifier 28 and the detector 30. The support plate 48 is moved in the x-y plane by the x and y-axis translators 17, 19. The acoustic waves detected by the transducer are processed to modulate the intensity of the CRT 20 which is scanned in coordination with the motion of the object of interest 50 in the focal plane.

It should be understood that when the object of interest 50, FIG. 6 is excited by an electrical current, localized heating may occur all across the object of interest. The acoustic lens 22, however, has an axis of maximum sensitivity which scans the object of interest on a point by point basis. The acoustic lens selectively detects the radiated acoustic waves and thus permits a high order of resolution.

The embodiment illustrated in FIG. 7 is similar to the embodiment of FIG. 6 with the addition of a laser 10 and an optical focusing lens 12. The laser is modulated to have either a pulsed or a periodic output. The optical output is brought to a focal point 14 by the lens 12. The focal point is coincident with the point of maximum sensitivity of the acoustic lens, and the optical lens 12 and the acoustic lens 22 are confocal. The combination of the laser and the electric current generator 46 increases the sensitivity of the apparatus and in effect biases the microscopic portion of the object of interest which emits the acoustic waves.

In operation the optical output from the laser 10, FIG. 7 and the electric current from the electric current generator 46 cause selected portions of the object of interest to heat and to expand in a cyclical manner relative to other portions of the object of interest. This cyclical expansion generates acoustic waves that are propagated through the fluid 24 and are detected by the acoustic lens 22 and the transducer 26. The acoustic waves are processed and displayed in the same manner described above.

FIG. 8 illustrates some of the sources of excitation that can be used on an object of interest 52. These sources include a microwave generator 54, an ultraviolet source 55, an x-ray source 56, a laser 57, and an electric current generator 58. In each case these sources direct either electromagnetic radiation or an electrical current into the object of interest so that a microscopic portion of the object is excited to a point where acoustic waves are generated. The present invention contemplates using all of these sources either individually or in combination to obtain a detectable acoustic output from the object of interest. The signals detected from the acoustic output are amplified and recorded along with the raster position of the object of interest in the same manner as described above.

It should be noted that much of the light incident on the object of interest is reflected rather than being absorbed into the object. This reflection can be overcome by using dielectric coatings. In addition, the large mismatch between the acoustic velocity of the acoustic waves in the object of interest and the acoustic velocity in the liquid reduces the available acoustic power that can be detected by the acoustic lens. This mismatch can be reduced by coating the object with a layer of impedance matching material.

It should also be noted that in the embodiments described herein the acoustic energy is usually at twice the frequency of the amplitude modulation of the heating source. This is because the heating is proportional to the square of the input.

Heat $\alpha\ I^2$
so if $$I = I_o e^{j\omega t}$$

where $\omega$ = frequency and $$I^2 = I_o^2 e^{2j\omega t}$$

However, in a biasing situation where $$I = I_{oo} + I_o e^{j\omega t}$$

where $I_{oo}$ = a constant component and $$I^2 = I_{oo}^2 + 2I_o I_{oo} e^{j\omega t} + I_o^2 e^{2j\omega t}$$

There is acoustic energy at $\omega$ since the $e^{2j\omega t}$ term is small. This occurs as the Raman case FIG. 5 described above. This also applies in the electric current embodiment FIG. 6 if a DC component of current and an AC component are used together.

Thus, although the best mode contemplated for carrying out the present invention has been herein shown and described, it will be apparent that variation may be made without departing from what is considered to be the subject matter of the invention.

What is claimed is:

1. An acoustic microscope, comprising:
   (a) means operatively connected to an object of interest for heating the object so that the object thermally expands and generates acoustic waves which are propagated therefrom;
   (b) means focused for detecting only the acoustic waves generated and propagated from a microscopic portion of the object of interest, said detecting means being sensitive to acoustic waves having frequencies greater than about 100 MHz; and
   (c) means connected to the object of interest and the detecting means for moving one of either the object of interest or the detecting means with respect to the other so that the object of interest is scanned in a raster pattern.

2. An acoustic microscope as in claim 1 wherein the detecting means includes an acoustic lens focused on the excited microscopic portion of the object of interest and an acoustic wave transducer connected thereto for detecting only the acoustic waves propagated from the object of interest and incident on the acoustic lens.

3. An acoustic microscope as in claim 1 wherein the exciting means is a laser focused on the object of interest; said object of interest absorbs the laser light and generates and propagates acoustic waves which are detected by the detecting means.

4. An acoustic microscope as in claim 1 wherein the exciting means is a source of x-rays, said x-rays being directed at the object of interest which absorbs the x-rays and generates and propagates acoustic waves which are detected by the detecting means.

5. An acoustic microscope as in claim 1 wherein the exciting means is a source of ultraviolet radiation, said radiation being directed at the object of interest which absorbs said radiation and generates and propagates acoustic waves which are detected by the detecting means.

6. An acoustic microscope as in claim 1 wherein the exciting means is a source of microwave radiation, said microwaves being directed at the object of interest which absorbs the radiation and generates and propagates acoustic waves which are detected by the detecting means.

7. An acoustic microscope as in claim 1 wherein the exciting means is an electric current generator having a periodic output I ($\omega$) of frequency $\omega$, the generator being connected to an electrical circuit for passing current through the object of interest, said object of interest generates and propagates acoustic waves having a frequency corresponding to the input frequency and which are detected by the detecting means.

8. An acoustic microscope, comprising:
   (a) a laser having an output of focused optical light energy, said light being focused on a microscopic portion of an object of interest so that the object absorbs the energy, thermally expands and generates acoustic waves which are propagated therefrom;
   (b) an acoustic lens focused on the object of interest and positioned so that the acoustic lens and the laser are confocal and the object of interest is located at the common focal point, said acoustic lens collimates only the incident acoustic waves propagated from the object;
   (c) an acoustic wave transducer connected to the acoustic lens for detecting the acoustic waves propagated from the microscopic portion of the object of interest, said acoustic wave transducer being sensitive to acoustic waves having frequencies greater than about 100 MHz;
   (d) means connected to the object of interest and the acoustic lens for moving one of either the object or the lens with respect to the other so that the object of interest is scanned in a raster pattern; and
   (e) means connected to the detecting means and the moving means for recording the detected acoustic waves and the corresponding raster position of the object of interest so that a visual image of the object can be obtained.

9. An acoustic microscope as in claim 8 wherein the laser transmits optical light into the object of interest along an axis of transmission and wherein the acoustic waves are detected by the transducer along an axis of reception, said axes being co-incident and the direction of propagation of the acoustic waves and the light being the same so that the acoustic microscope operates in a transmission mode.

10. An acoustic microscope as in claim 8 wherein the laser transmits optical light into the object of interest along an axis of transmission which makes an angle $\alpha$ with respect to an axis orthogonal to the surface of the object of interest and wherein the transducer detects acoustic waves propagating along an axis of reflection which makes an angle $\beta$ with respect to the orthogonal axis, said angle $\alpha$ being equal to angle $\beta$ and said axes of transmission and reflection being coplanar with the orthogonal axis so that the acoustic microscope operates in a reflection mode.

11. An acoustic microscope as in claim 8 wherein the laser is Q-switched and mode locked so that the laser propagates short pulses of high frequency optical light into the object of interest.

12. An acoustic microscope as in claim 8 wherein the laser is a single frequency, tunable light source which excites the object of interest with one of a plurality of optical frequencies.

13. An acoustic microscope as in claim 8 including an electrooptic modulator for modulating the optical output from the laser at a frequency $\omega$ greater than 100 MHz so that the light which excites the object of interest has a sinusoidal amplitude variation.

14. An acoustic microscope, comprising:
   (a) a first laser having an output of focused optical light of frequency $\nu_1$;
   (b) a second laser having a modulated output of focused optical light at a frequency $\nu_2$, both said lasers being focused on a microscopic portion of an object of interest and said frequencies being such that $|\nu_1-\nu_2|$ equals the Raman frequency vibration mode of one of the constituents of the object;
   (c) an acoustic lens focused on the object and positioned so that the acoustic lens and the lasers are confocal and the object is at the common focal point, said acoustic lens collimates the incident acoustic waves from the object;
   (d) an acoustic wave transducer connected to the acoustic lens for detecting the acoustic waves propagated from the object of interest;
   (e) means connected to the object of interest and the acoustic lens for moving one of either the object or the lens with respect to the other so that the object of interest is scanned in a raster pattern; and
   (f) means connected to the detecting means and the moving means for recording the detected acoustic waves and the corresponding raster position of the object of interest so that a visual image of the object can be obtained.

15. An acoustic microscope, comprising:
   (a) an electric current generator having a periodic output I ($\omega$) of frequency $\omega$, the generator being connected to an electrical circuit for passing current through an object of interest, said current causing the object of interest to be periodically heated so that acoustic waves of a corresponding frequency are generated and propagated from the object;
   (b) an acoustic lens focused on the object of interest and positioned so that the focal point of the lens is coincident with the object of interest, said acoustic lens collimates the incident acoustic waves from the object;
   (c) an acoustic wave transducer connected to the acoustic lens for detecting the acoustic waves propagated from the object of interest, said acoustic wave transducer being sensitive to acoustic waves having frequencies greater than about 100 MHz;
   (d) means connected to the object of interest and the acoustic lens for moving one of either the object or the lens with respect to the other so that the object of interest is scanned in a raster pattern; and
   (e) means connected to the detecting means and the moving means for recording the detected acoustic waves and the corresponding raster position of the object of interest so that a visual image of the object can be obtained.

16. An apparatus as in claim 15 including a laser having an output of focused optical light energy, said light energy being focused on a microscopic portion of the object of interest coincident with the focal point of the acoustic lens so that acoustic waves are generated and propagated from the object of interest through combined electrical and electromagnetic excitation.

17. An apparatus as in claim 15 including a source of microwaves having an output which is directed at a portion of the object of interest coincident with the focal point of the acoustic lens so that acoustic waves are generated and propagated from the object of interest through combined electrical and electromagnetic excitation.

18. An acoustic method for microscopically imaging an object of interest, comprising the steps of:
   (a) exciting an object of interest by heating so that acoustic waves are generated and propagated therefrom;
   (b) detecting the acoustic waves propagated only from a microscopic portion of the object of interest having frequencies greater than about 100 MHz;
   (c) translating one of either the object of interest or the detecting means with respect to the other so that the microscopic portion of the object of interest is scanned in a raster pattern; and
   (d) recording the detected acoustic waves and the corresponding raster position of the object of interest so that a visual image of the object can be obtained.

19. A method as in claim 18 wherein the step of detecting includes collimating the acoustic waves propagated from the object of interest with an acoustic lens and converting the collimated acoustic waves into electrical signals with a transducer mounted on the acoustic lens.

20. A method as in claim 18 wherein the step of exciting includes directing electromagnetic radiation into the object of interest so that acoustic waves are generated and propagated therefrom.

21. A method as in claim 18 wherein the step of exciting includes energizing the object of interest with a cyclically varying electrical current so that acoustic waves are generated and propagated therefrom.

22. A method as in claim 18 wherein the step of exciting includes selectively exciting microscopic portions of the object of interest.

23. An acoustic method for microscopically imaging an object of interest, comprising the steps of:
   (a) heating an object of interest in a cyclical manner so that the object of interest expands and contracts in response thereto and acoustic waves are generated and propagated thereby;
   (b) focusing an acoustic lens on microscopic portions of the heated object of interest so that only the acoustic waves propagated therefrom are collimated;
   (c) detecting acoustic waves having frequencies greater than about 100 MHz and converting said waves into corresponding electrical signals;
   (d) translating one of either the object of interest or the acoustic lens with respect to the other so that the object of interest is scanned in a raster pattern; and (e) recording the electrical signals and the corresponding raster position of the object of interest so that a visual image of the object can be obtained.

24. A method as in claim 23 wherein the step of heating includes selectively heating microscopic portions of the object of interest.

25. An acoustic method for spectrographically analyzing objects of interest, comprising the steps of:
   (a) heating an object of interest with both cyclical and amplitude modulated electromagnetic radiation so that acoustic waves are generated and propagated therefrom;
   (b) varying the amplitude modulation of the electromagnetic radiation so that acoustic waves of correspondingly varying frequency are generated and propagated from the object;
   (c) detecting only the acoustic waves propagated from a microscopic portion of the object of interest having frequencies greater than about 100 MHz; and
   (d) measuring the change in intensity of the detected acoustic waves corresponding to the variation in the electromagnetic radiation so that the absorption spectrum of the object of interest is observed and thereby spectrographically analyzing the object of interest.

26. An acoustic method for determining the Raman frequency mode of an object of interest, comprising the steps of:
   (a) focusing laser light having an optical frequency $\nu_1$ on a microscopic portion of an object of interest;
   (b) focusing modulated laser light having an optical frequency $\nu_2$ on the same microscopic portion of the object;
   (c) varying the absolute value of the difference between the two optical frequencies ($|\nu_1-\nu_2|$) so that the molecules in the object of interest become excited and acoustic waves are propagated therefrom;
   (d) detecting the acoustic waves propagated from the microscopic portion of the object; and
   (e) measuring the change in intensity of the detected acoustic waves corresponding to the variation in said absolute value so that the Raman spectra of the microscopic portion of the object of interest is determined along with the Raman frequency mode.

27. An acoustic microscope, comprising:
   (a) a first laser having an output of focused optical light of frequency $\nu_1$;
   (b) a second laser having a modulated output of focused optical light at a frequency $\nu_2$, both said lasers being focused on a microscopic portion of an object of interest, said frequency $\nu_1$ corresponding to an electronic excited state of an atom in the object of interest so that the atom is transferred from a ground state to an excited state;
   (c) an acoustic lens focused on the object and positioned so that the acoustic lens and the lasers are confocal and the object is at the common focal point, said acoustic lens collimates the incident acoustic waves from the object;
   (d) an acoustic wave transducer connected to the acoustic lens for detecting the acoustic waves propagated from the object of interest;
   (e) means connected to the object of interest and the acoustic lens for moving one of either the object or the lens with respect to the other so that the object of interest is scanned in a raster pattern; and
   (f) means connected to the detecting means and the moving means for recording the detected acoustic waves and the corresponding raster position of the object of interest so that a visual image of the object can be obtained.

28. An acoustic method for determining the atomic constants of an object of interest, comprising the steps of:
   (a) focusing laser light having an optical frequency $\nu_1$ on a microscopic portion of an object of interest;
   (b) focusing modulated laser light having an optical frequency $\nu_2$ on the same microscopic portion of the object, said frequency $\nu_1$ corresponding to an electronic excited state of an atom in the object of interest;
   (c) transferring said atom from a ground state to an excited state by use of said laser light so that acoustic waves are propagated therefrom;
   (d) detecting the acoustic waves propagated from the microscopic portion of the object; and
   (e) translating one of either the object of interest or the detecting means with respect to the other so that the object of interest is scanned in a raster pattern; and
   (f) recording the detected acoustic waves and the corresponding raster position of the object of interest so that a visual image of the object can be obtained.

* * * * *